US012610171B2

(12) United States Patent
Zou et al.

(10) Patent No.: US 12,610,171 B2
(45) Date of Patent: Apr. 21, 2026

(54) EARBUDS

(71) Applicant: Apple Inc., Cupertino, CA (US)

(72) Inventors: Yi Zou, Cupertino, CA (US); Chad J. Miller, Oakland, CA (US); Daniel A. Podhajny, Morgan Hill, CA (US); Joshua A. Hoover, Boulder, CO (US); Kristen L. Cretella, San Francisco, CA (US); Nicholas R. Trincia, San Francisco, CA (US); Seul Bi Kim, San Mateo, CA (US); William Leith, San Francisco, CA (US); Yue Chen, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 434 days.

(21) Appl. No.: 18/484,007

(22) Filed: Oct. 10, 2023

(65) Prior Publication Data

US 2024/0040298 A1 Feb. 1, 2024

Related U.S. Application Data

(63) Continuation of application No. 17/407,691, filed on Aug. 20, 2021, now Pat. No. 11,818,528.

(Continued)

(51) Int. Cl.

*H04R 1/10* (2026.01)
*F21V 33/00* (2006.01)

(Continued)

(52) U.S. Cl.

CPC ............. *H04R 1/1016* (2013.01); *H04R 1/04* (2013.01); *H04R 1/1041* (2013.01); *H04R 31/00* (2013.01);

(Continued)

(58) Field of Classification Search

CPC ...... H04R 1/1016; H04R 1/04; H04R 1/1041; H04R 31/00; H04R 1/028; H04R 2420/07;

(Continued)

(56) References Cited

U.S. PATENT DOCUMENTS

| | | | |
|---|---|---|---|
| 4,962,537 | A | 10/1990 | Basel et al. |
| 6,022,311 | A | 2/2000 | Juneau et al. |
| 6,393,130 | B1 | 5/2002 | Stonikas et al. |
| 8,540,363 | B2 | 9/2013 | Abreu |

(Continued)

FOREIGN PATENT DOCUMENTS

| | | |
|---|---|---|
| CN | 113068094 A | 7/2021 |

*Primary Examiner* — Angelica M Mckinney

(74) *Attorney, Agent, or Firm* — Treyz Law Group, P.C.; Joseph F. Guihan

(57) ABSTRACT

Wireless earbuds may be provided with adjustable-shape housings. The housings may have bendable portions. Bendable metal members, hinges, or other flexible structures may be used in forming bendable structures for the earbuds. Electrical components may be covered by a layer of molded foam. A cover such as a fabric cover may be used to cover the molded foam. Spacer fabric or other soft material may be interposed between the fabric cover and the foam. The housing may be bent or otherwise adjusted between two or more states such as a normal, non-sleep, walking state in which the housing is expanded for normal operation while a user is sitting or walking and a sleep state in which the housing is bent to enhance comfort while sleeping. The wireless earbuds may have illumination systems, sensors, and other components.

20 Claims, 16 Drawing Sheets

Related U.S. Application Data

(60) Provisional application No. 63/081,212, filed on Sep. 21, 2020.

(51) Int. Cl.
*H04R 1/02* (2006.01)
*H04R 1/04* (2006.01)
*H04R 31/00* (2006.01)

(52) U.S. Cl.
CPC .......... *F21V 33/0056* (2013.01); *H04R 1/028* (2013.01); *H04R 2420/07* (2013.01)

(58) Field of Classification Search
CPC .............. H04R 2201/107; H04R 25/00; H04R 1/1058; F21V 33/0056
See application file for complete search history.

(56) References Cited

U.S. PATENT DOCUMENTS

| | | | | |
|---|---|---|---|---|
| 9,020,168 | B2 | 4/2015 | Karkkainen et al. | |
| 9,131,311 | B2 | 9/2015 | Lumsden et al. | |
| 9,635,452 | B2 | 4/2017 | Cheng et al. | |
| 9,968,197 | B2 | 5/2018 | Wong | |
| 10,117,015 | B2 * | 10/2018 | Armstrong | H04R 1/1016 |
| 10,212,525 | B2 | 2/2019 | Hagen et al. | |
| 10,757,491 | B1 * | 8/2020 | Jackson | G06F 3/167 |
| 11,818,528 | B1 * | 11/2023 | Zou | H04R 1/1016 |
| 2007/0121980 | A1 | 5/2007 | Menzl | |
| 2010/0056233 | A1 | 3/2010 | Thiel et al. | |
| 2013/0208932 | A1 | 8/2013 | Norgaard et al. | |
| 2014/0270191 | A1 | 9/2014 | Nikles | |
| 2018/0167716 | A1 | 6/2018 | Fujimoto et al. | |
| 2019/0098390 | A1 | 3/2019 | Carino et al. | |
| 2019/0099009 | A1 | 4/2019 | Connor | |
| 2020/0186904 | A1 | 6/2020 | Krull | |
| 2020/0186949 | A1 | 6/2020 | Krull et al. | |

* cited by examiner

EARBUDS

This application is a continuation of U.S. non-provisional patent application Ser. No. 17/407,691, filed Aug. 20, 2021, which claims the benefit of U.S. provisional patent application No. 63/081,212, filed Sep. 21, 2020, which are hereby incorporated by reference herein in their entireties.

FIELD

This relates generally to electronic devices, and, more particularly, to electronic devices such as earbuds.

BACKGROUND

Electronic devices such as headphone devices may have speakers for presenting audio to a user. Wireless earbuds may have a compact shape that enables the earbuds to be worn in the ears of a user.

SUMMARY

Wireless earbuds may be provided with adjustable housings. The housings may have bendable portions, axially compressible structures, and/or other structures that allow the shape and size of the housing to be adjusted. In an illustrative configuration, the housing may be placed in a normal operating state (sometimes referred to as a walking state) in which the earbuds are adjusted to have a normal (walking) shape (e.g., a non-sleep shape) suitable to be received within and supported by a user's ear as the user is walking or sitting upright and may be paced in a sleep state in which the housing is bent or otherwise adjusted into a sleep shape that enhances comfort while sleeping.

The earbuds may have printed circuits. Electrical components may be coupled to the printed circuits. The electrical components and printed circuits may be covered by a layer of molded foam. A cover such as a fabric cover may be used to cover the molded foam. Spacer fabric or other soft material may be interposed between an outer fabric layer and the foam.

The wireless earbuds may have illumination systems, sensors, and other components.

DETAILED DESCRIPTION

Electronic devices such as in-ear headphone devices may be used to play audio for a user. As an example, wireless earbuds may wirelessly receive music tracks and other media that includes audio data. The earbuds may contain speakers for playing corresponding audio for the user.

To enhance user comfort and to accommodate different usage scenarios, earbuds may be provided with housings that are soft to the touch and/or that have adjustable shapes and sizes. For example, a pair of earbuds may have a housing that can be placed in a normal operating configuration (sometimes referred to as a walking or sitting configuration) in which the earbuds are configured to be worn securely as a user walks, runs, or sits upright. When the user desires to sleep or otherwise rest the user's head horizontally on a pillow, the earbuds can be adjusted. For example, the housing of the earbud may be bent into a shape that allows the earbud to be comfortably worn while the earbud is compressed between the user's ear and a pillow. In this configuration, which may sometimes be referred to as a sleep configuration, the earbud may be more comfortable to wear to sleep than when the earbud is in its normal non-sleep shape.

Figure 1:
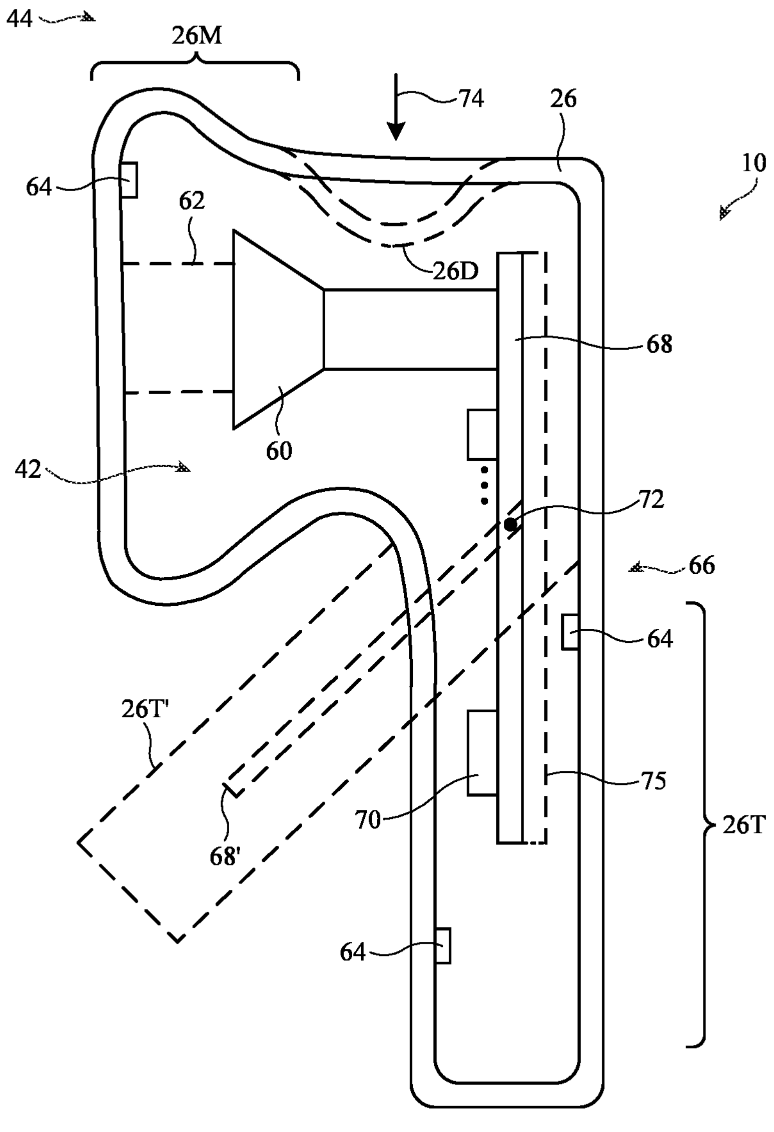
FIG. 1 is a cross-sectional side view of an illustrative electronic device such as an earbud in accordance with an embodiment.

FIG. 1 is a cross-sectional side view of an illustrative adjustable earbud (e.g., a left or right earbud in a pair of earbuds). As shown in FIG. 1, earbud 10 may include earbud housing 26. Housing 26, which may sometimes be referred to as a support structure or enclosure, may have walls or other structures that separate an interior region of earbud 10 such as interior region 42 from an exterior region surrounding earbud 10 such as exterior region 44. Speakers such as speaker 60 and other electrical components 70 (e.g., integrated circuits, sensors, control circuitry, input-output devices, etc.) may be mounted on printed circuits and/or other structures within earbud 10 such as printed circuit 68 (e.g., in interior region 42). Printed circuits such as printed circuit 68 may include flexible printed circuits (e.g., printed circuits formed from flexible sheets of polymer such as layers of polyimide or other flexible layers) and/or rigid printed circuits (e.g., printed circuits formed from rigid printed circuit board material such as fiberglass-filled epoxy).

Input-output devices such as speaker 60 may be used to provide a user with output. For example, speaker 60 may be used to produce audio output (sound) through audio port 62 (e.g., an opening or an array of openings in the wall of housing 26). In some arrangements, earbud 10 may have one or more sensors. For example, capacitive sensors such as capacitive sensors configured to detect touch and/or force input, optical proximity sensors, and/or other sensors may be formed at locations such as locations 64. These sensors may be used to sense contact with housing 26 by the ear of a user, by a user's finger or other body part. Sensors in earbud 10 (e.g., sensors at locations 64) may serve as ear-presence sensors that can detect when earbud 10 has been inserted into the ear of a user and is being worn and/or can serve as force sensors and/or touch sensors that detect when a user has touched the housing of earbud 10 with the user's fingers. In some configurations, earbud 10 may include a position sensors (e.g. an inertial measurement unit or other sensor that detects earbud orientation relative to the Earth's gravity, motion, etc.). Sensors such as accelerometers can be used to detect user tap input (e.g., by measuring vibrations due to user finger taps on housing 26).

Housing 26 may be formed from one or more layers of material (e.g., polymer, glass, ceramic, metal, fabric, etc.). In some configurations, housing 26 or portions of housing 26 may be soft to the touch. For example, some or all of housing 26 may be formed from a soft material such as foam or spacer fabric that allows the surface of housing 26 to be deformed. Housing 26 may, as an example, be deformed inwardly in response to applied inward force in direction 74, as illustrated by deformed portion 26D of housing 26. Deformable portions of housing 26 may be aligned with internal sensors (e.g., buttons, force sensors, etc.) so that a user may supply input by squeezing housing 26.

Housing 26 may have any suitable shape (e.g., spherical, cylindrical, conical, frustoconical, cubical, etc.). In the example of FIG. 1, which is illustrative, housing 26 includes a main portion 26M (e.g., a bulbous portion with a curved cross-sectional profile) that is configured to be received within the ear of a user and includes an elongated portion that extends from main portion 26M such as stalk portion 26T (sometimes referred to as the tail portion of housing 26). Other shapes may be used for housing 26, if desired.

To accommodate desired changes in shape, one or more structures in earbud 10 may be bendable. For example, printed circuits such as printed circuit 68 may be formed from a flexible printed circuit material that allows printed circuit 68 to be bent about bend axis 72 to a bent position such as position 68'. Housing 26 may also have portions that are flexible and can be bent along with printed circuit 68. Housing 26 may, as an example, have a flexible portion such as portion 66 that allows stalk portion 26T to be bent about bend axis 72 to a position such as position 26T'. Flexible housing portions such as bendable portion 66 and/or other portions of earbud 10 (e.g., bendable support structures such as bendable internal support 75 of FIG. 1, which may be coupled to printed circuit 68 by adhesive or other attachment structures) may be formed from elastomeric materials such as silicone, flexible materials such as fabric layers, bendable metal (e.g., bendable metal sheets or elongated bendable members such as bendable rods, etc.), and/or other bendable structures (e.g., flexible polymer, hinge structures, etc.).

Figure 2:
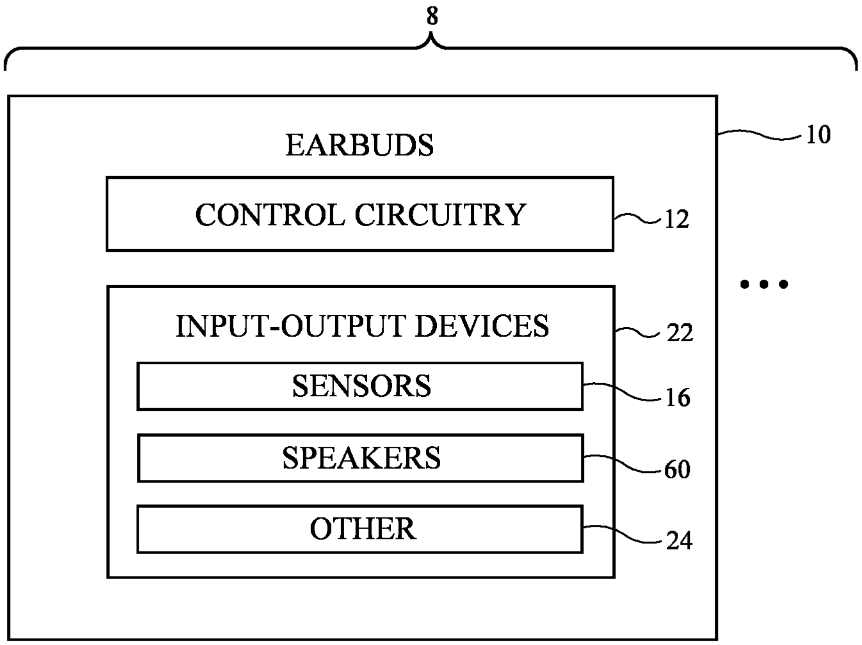
FIG. 2 is schematic diagram of an illustrative system with an electronic device in accordance with an embodiment.

A schematic diagram of an illustrative system that may include earbuds such as earbud 10 of FIG. 1 is shown in FIG. 2. As shown in FIG. 2, system 8 may have one or more electronic devices such as earbuds 10 and/or other electronic devices. These devices may include earbuds (in-ear headphones) and associated computing devices (e.g., a cellular telephone, tablet computer, laptop computer, desktop computer, a head-mounted device, and/or remote computing equipment that supplies content to earbuds 10), and/or other devices that communicate with earbuds 10 and/or each other.

Each electronic device (e.g., earbuds 10 and/or other devices in system 8) may have control circuitry 12. Control circuitry 12 may include storage and processing circuitry for controlling the operation of earbuds 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for earbuds 10 (e.g., data gathering operations, operations involving the adjustment of the components of earbuds 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), personal area network circuitry (e.g., Bluetooth® circuitry), other circuitry for supporting local and/or remote wireless communications links, and/or other wireless communications circuitry.

During operation, the communications circuitry of the devices in system 8 (e.g., the communications circuitry of control circuitry 12 of earbuds 10) may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, personal area network links such as Bluetooth® links, etc.). The communications circuitry may be used to allow data to be received by earbuds 10 from external equipment (e.g., a tethered computer, a portable device such as a handheld device or laptop computer, online computing equipment such as a remote server or other remote computing equipment, or other electrical equipment) and/or to provide data to external equipment.

Earbuds 10 may include input-output devices 22. Input-output devices 22 may be used to allow a user to provide earbud 10 with user input. Input-output devices 22 may also be used to gather information on the environment in which earbuds 10 are operating. Output components in devices 22 may allow earbuds 10 to provide a user with output (e.g., sound from speakers, haptic output, etc.) and may be used to communicate with external electrical equipment.

As shown in FIG. 2, input-output devices 22 may include speakers 60. A left earbud may contain a left speaker and a right earbud may contain a right speaker. This allows earbuds to provide a user with stereo audio playback. If desired, the input-output devices of earbuds may include visual output devices (e.g., light-emitting devices such as lasers and/or light-emitting diodes, displays, etc.). Other electronic devices in system 8 may also have displays and other light-emitting components.

Input-output devices 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional light detection and ranging sensors, sometimes referred to as lidar sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors (e.g., strain gauges, capacitive force sensors, resistive force sensors, etc.), sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors. Sensors such as accelerometers may be used to gather tap input on housing 26 from a user's fingers (as an example). Voice input (e.g., for voice commands) may be gathered using a microphone.

User input and other information may be gathered using sensors and other input devices in input-output devices 22. If desired, input-output devices 22 may include other devices 24 such as haptic output devices, circuits for receiving wireless power, circuits for transmitting power wirelessly to other devices, batteries and other energy storage devices (e.g., capacitors), joysticks, buttons, and/or other components.

Figure 3:
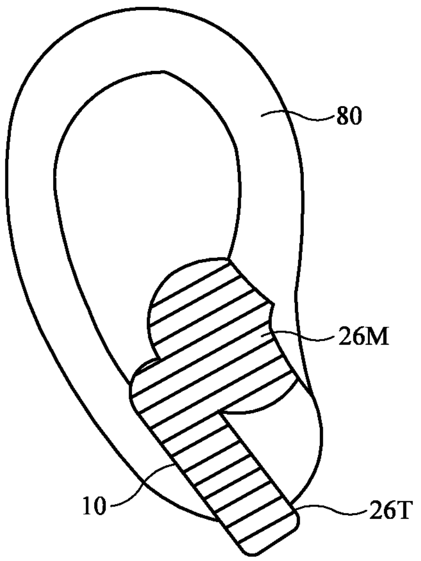
FIG. 3 is a side view of an illustrative earbud in an ear of a user in a first illustrative configuration in accordance with an embodiment.
Figure 4:
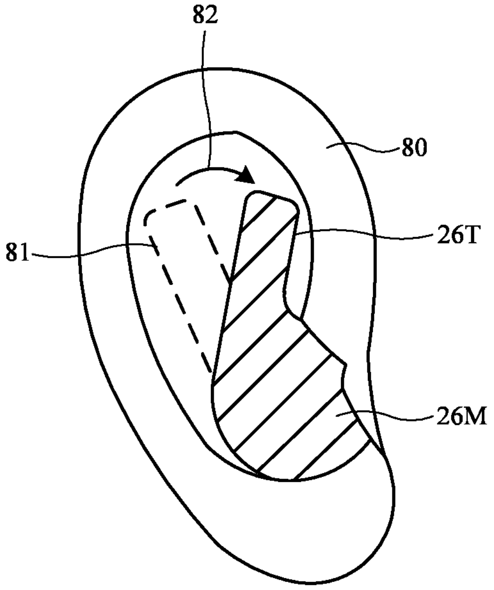
FIG. 4 is a side view of the illustrative earbud of FIG. 3 in the ear of the user in a second illustrative configuration in accordance with an embodiment.

FIGS. 3 and 4 show how an earbud 10 may be adjusted to accommodate different modes of operation. In the illustrative configuration of FIG. 3, stalk portion 26T has not been bent out of its normal position and extends downwards from main portion 26M as earbud 10 is being worn in the user's ear (e.g., when main portion 26M is received within ear 80 as shown in FIG. 3). This type of configuration may be satisfactory when the user's head is not in contact with external objects and the user is sitting, walking, running, or standing upright. As a user prepares for sleep in the evening or when a user desires to rest the user's head and ear against a pillow, the user may adjust earbud 10. For example, housing 26 may be adjusted by bending stalk 26T in direction 82 relative to housing portion 26M as shown in FIG. 4. Earbud 10 may also be rotated so that stalk portion 26T extends upwards rather than downwards. This causes stalk 26T to move in direction 82 from position 81 to the position shown by stalk 26T in FIG. 4. The bending of housing 26 in this way, helps move stalk 26T away from protruding portions of the user's ear, so that stalk 26T does not become uncomfortably pinched between ear 80 and the pillow or other structure against which the user's ear presses when the user is sleeping. The bent shape of housing 26 of FIG. 4 allows housing 26 to be accommodated within the contours of the user's ear, so that the user can listen to music or other audio comfortably. In this bent configuration, the fit of housing 26 may be somewhat loose when the user is sitting or standing upright (e.g., housing 26 in the sleep configuration may not be held in the user's ear as firmly as when housing 26 is unbent during normal operation). Nevertheless, the enhanced comfort of the bent sleep configuration that is exhibited when resting ear 80 against a pillow or other surface allows the user to use earbud 10 satisfactorily during sleep and rest activities.

Comfort may also be enhanced by forming portions of earbud 10 from soft materials. These soft materials may include soft polymer (e.g., polymer foam, elastomeric materials such as silicone or thermoplastic polyurethane), fabric (e.g., knit fabric, woven fabric, braided materials, felts, etc.), leather and other natural materials, and/or other pliable materials. These materials may be provided in one or more layers to form housing 26 and may be attached to each other using fasteners, mechanical engagement structures (e.g. clips, snaps, etc.), and/or layers of adhesive.

Figure 5:
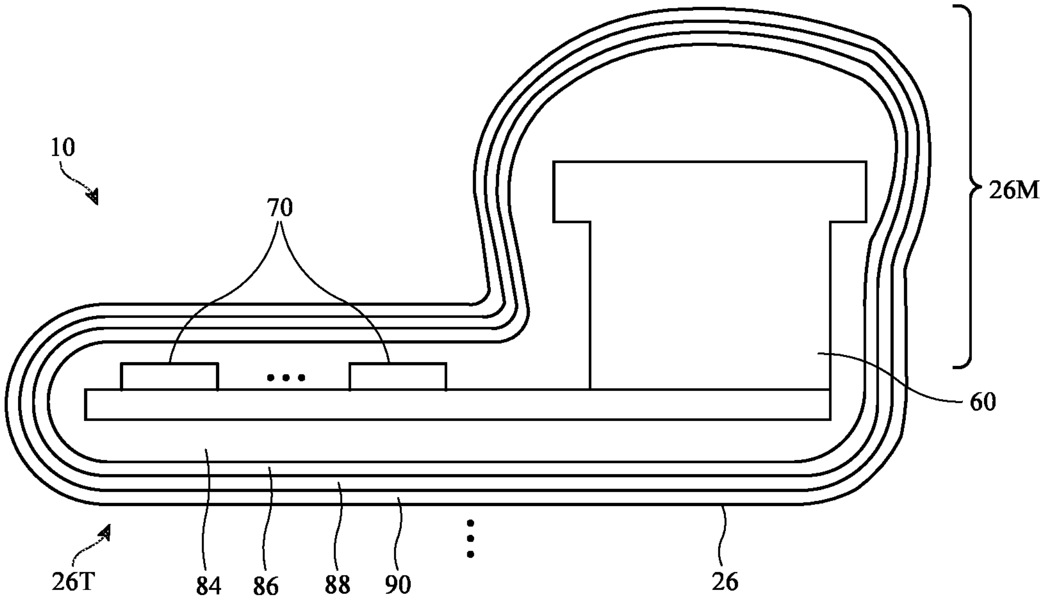
FIG. 5 is a cross-sectional side view of an illustrative earbud in accordance with an embodiment.

Consider, as an example, the illustrative configuration for earbud 10 that is shown in FIG. 5. As shown in FIG. 5, housing 26 may be formed from one or more layers of material such as illustrative layers 84, 86, 88, and 90. Speaker 60 and other components 70 (e.g., input-output devices 22, control circuitry 12, a battery, etc.) may be coupled to printed circuit 68. Speaker 60 may be coupled to printed circuit 68 in portion 26M (e.g., in alignment with audio port 62 of FIG. 1). The layers of material that form housing 26 may be soft and/or flexible, thereby allowing portion 26T and/or other portions of housing 26 to flex and bend. For example, portion 26T may bend about an axis such as bend axis 72 of FIG. 1 and/or to bend about additional locations along the length of housing 26.

Housing 26 may be sufficiently soft to conform to the shape of ear 80 when earbud 10 is being worn by a user. If desired, components 70 may include switches, force sensors, and/or other components that can be actuated by squeezing and thereby locally deforming housing 26. For example, a force sensor, on/off switch, or other buttons and/or sensors may be pressed by squeezing the sides of portion 26T with the user's fingers. If desired, user tap input may be provided by using an accelerometer to measure vibrations resulting from user taps on the surface of housing 26. Voice input may be gathered using a microphone in devices 22.

In an illustrative configuration, innermost layer 84 is a soft polymer that is molded over printed circuit 68, molded over speaker 60 (except in port 62) and molded over components 70. Layer 84 may, for example, be formed from overmolded polymer foam (e.g., silicone foam, thermoplastic polyurethane foam, etc.). The shape of the outer surface of the molded polymer foam may help define the overall shape of the outer surface of earbud 10.

After molding the polymer foam or other inner layer material over the internal components of earbud 10, one or more additional layers may be formed on the outer surface of this molded layer to serve as a protective and cosmetic cover. In the illustrative configuration of FIG. 5, there are three additional layers (layers 86, 88, and 90) mounted over layer 84. More layers or fewer layers may be used to cover layer 84, if desired.

In a first illustrative embodiment, the internal components of earbud 10 are covered with a foam layer (e.g., layer 84), a non-foam elastomeric polymer skin layer (e.g., a layer of elastomeric polymer such as a thin silicone layer or layer of thermoplastic polyurethane), and a removable fabric layer (e.g., layer 86, which may be a layer of fabric formed from woven strands of material such as polymer strands, knit fabric, or braided fabric). If desired, metal strands may be woven or otherwise formed into a fabric (e.g., to form a metal mesh). Fabric layer(s) for earbuds 10 that include combinations of multiple materials such as natural materials (e.g. cotton or wool), metal, glass, and/or polymer may also be used.

In a second illustrative embodiment, the internal components of earbud 10 are covered with a polymer foam layer (e.g. layer 84), a layer of polymer adhesive (e.g., layer 86), and an outer fixed textile layer (e.g., layer 88, which may be a fabric layer formed from natural materials, glass, polymer, metal, etc.).

In a third illustrative embodiment, molded foam layer 84 is omitted and layer 86 is an adhesive layer that is used to attach layers 88 and 90 over internal earbud components. Layers 88 and 90 may, as an example, form a textile cover layer that includes an outer fabric layer (layer 90) that is formed integrally with or separate from inner fabric layer 88 (e.g., a spacer fabric layer). Spacer fabric material helps provide the outer surface of earbud 10 with a soft feel to the touch. When spacer fabric is used in covering an inner soft layer such as a molded foam layer, the presence of the spacer fabric may help provide earbud 10 with additional softness.

Figure 6:
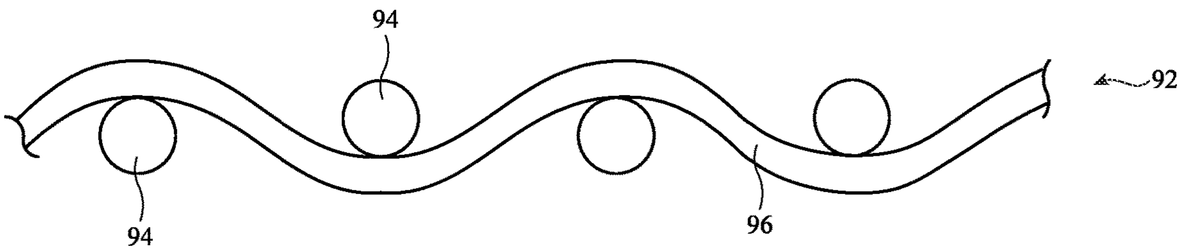
FIG. 6 is a cross-sectional side view of an illustrative fabric layer in accordance with an embodiment.

FIG. 6 is a cross-sectional side view of an illustrative fabric layer 92 (e.g., a fabric layer for one of the covering layers of earbud 10). As shown in FIG. 6, fabric such as fabric layer 92 may have interlaced warp strands 94 and weft strands 96. If desired, fabric layers such as fabric layer 92 may be formed by knitting, braiding, and/or other strand interlacing techniques (sometimes referred to as strand intertwining techniques).

Figure 7:
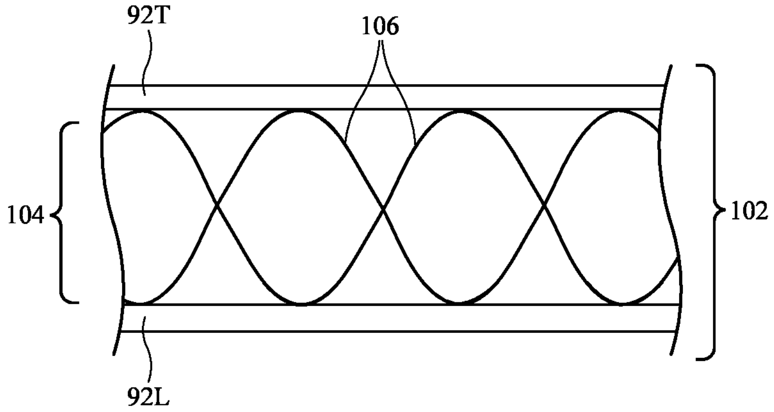
FIG. 7 is a cross-sectional side view of an illustrative layer of spacer fabric in accordance with an embodiment.

FIG. 7 is a cross-sectional side view of illustrative spacer fabric. In the example of FIG. 7, spacer fabric 102 includes spacer fabric layer 104 that has been formed integrally with upper fabric layer 92T and lower fabric layer 92L. In this illustrative arrangement, strands 106 of layer 104 are interlaced with layers 92T and 92L. If desired, fabric layers such as layers 92T and/or 92L may be attached to a layer of spacer fabric (e.g., layer 104) using adhesive. The construction of spacer fabric 104 provides fabric 104 with a soft feel to the touch.

Figure 8:
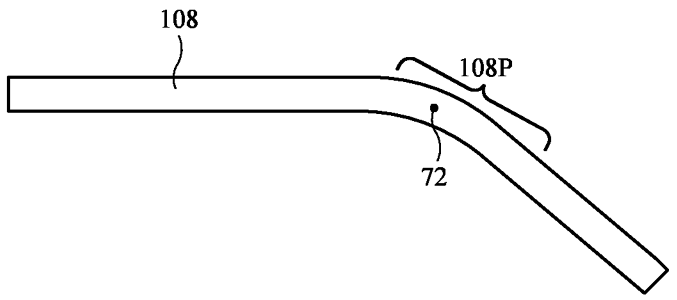
FIG. 8 is a cross-sectional side view of an illustrative hinge formed from flexible material in accordance with an embodiment.

To facilitate bending of internal earbud structures about bend axis 72, bendable structures may be used to form internal support structures (sometimes referred to as internal frame structures or internal support structures). These structures may include bendable structures that are attached to printed circuit 68 and other internal components by adhesive, structures that are attached to printed circuit 68 and other internal components by fasteners or mechanical engagement structures, etc. An illustrative bendable support structure that may be incorporated into the interior of earbud 10 is shown by bendable member 108 of FIG. 8. Member 108 may be formed from a bendable wire, a bendable strip of material (e.g., a bendable sheet of material having an elongated shape configured to fit within the confines of housing 26), and/or other bendable structures. Member 108 (or at least portion 108P of member 108) may be formed from material that is flexible such as flexible polymer, flexible metal, etc. In an illustrative configuration, member 108 is formed from a bendable metal that retains its shape after bending, thereby allowing housing 26 to hold its bent shape when a user bends portion 26T to help earbud 10 conform to the shape of the user's ear as described in connection with FIG. 4. Foam and/or other material may be molded over bendable structures such as bendable member 108.

Figure 9:
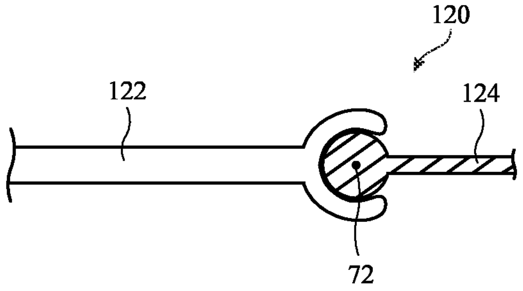
FIG. 9 is a cross-sectional side view of an illustrative hinge formed from interlocking hinge structures in accordance with an embodiment.

Another illustrative bendable internal support structure for earbud 10 is shown in FIG. 9. In the FIG. 9 example, structure 120 is a hinge formed from two interlocking members such as first member 122 and second member 124. Members 122 and 124 may have structures that rotatably engage with each other to allow the hinge formed by structure 120 to rotate about bend axis 72. Sufficient friction may be formed between the engaging portions of members 122 and 124 to allow these portions to form a hinge friction clutch. This allows structure 120 to hold its bent shape (e.g. when earbud 10 is bent as described in connection with FIG. 4).

Figure 10:
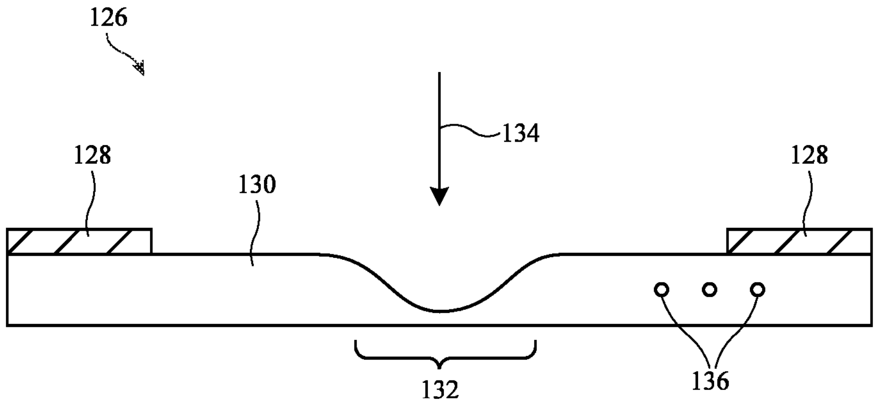
FIG. 10 is a cross-sectional side view of an illustrative resistive sensor in accordance with an embodiment.

If desired, a force sensor under flexible portions of housing 26 may be used to gather user input. A force sensor may, for example, serve as an input device that responds to finger squeeze pressure from a user's fingers. Force sensors may be formed from capacitive sensor plates separated by compressible foam, may be formed from strain gauges, and/or may be formed from other pressure-sensing structures. In an illustrative configuration, a force sensor for earbud 10 may be formed using resistive force sensor structures, as shown in FIG. 10. As shown in FIG. 10, resistive force sensor 126 may have a layer of polymer 130 or other compressible material that contains conductive particles 136. This provides the polymer layer with a resistance that changes as the polymer is compressed. Electrodes 128 may be formed on the polymer layer. When a user presses on portion 132 in direction 134, polymer 103 is compressed, conductive particles of layer 130 come into contact with each other, and the resistance between electrodes 128 is reduced. Changes in resistance for sensor 126 of FIG. 10 and/or other force sensor changes that are indicative of applied force can be measured by control circuitry 12. Sensor 126 and/or other force sensors in earbud 10 may, if desired, detect bending along the length of housing 26 (e.g., bending which locally compresses portion 132 as shown in FIG. 10).

Figure 11:
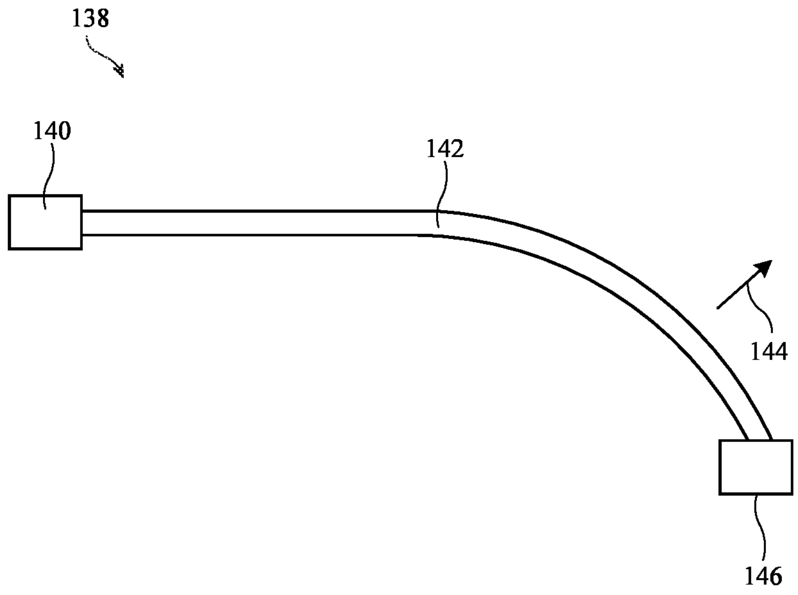
FIG. 11 is a cross-sectional side view of an illustrative light-based bend sensor in accordance with an embodiment.

FIG. 11 is a cross-sectional side view of an illustrative light-based sensor for earbud 10. Light-based sensor 138 may have a light-emitting device 140 (e.g., a laser or light-emitting diode) that is configured to emit light into waveguide 142 (e.g., an optical fiber, a strip of clear polymer or other transparent waveguide material). Light that is emitted into waveguide (light guide) 142 may travel along the length of waveguide 142 in accordance with the principal of total internal reflection. Sensor 138 may also have a light detector such as photodetector 146 that is configured to measure the amount of waveguided light that is received after traveling the length of waveguide 134. Sensor 138 may extend along a printed circuit such as printed circuit 68 of FIG. 1 that overlaps bend axis 72 and/or may extend along other portions of the elongated housing of earbud 10. When housing 26 and printed circuit 68 are bent about axis 72, waveguide 134 will be bent accordingly and total internal reflection will be locally defeated. This causes some waveguided light to escape (see, e.g., escaping light 140). Changes in the amount of light measured at photodetector 146 therefore reveal how much bending is present in housing 26. If desired, deformation of the housing of earbud 10 may cause detectable bending of waveguide 142 (e.g., sensor 138 may serve as an optical force sensor).

To provide illumination for some or all of housing 26, an illumination system may be provided under some or all of the covering layers for housing 26. The covering layers may have transparent window portions formed from clear strands of material, clear polymer layers, openings such as perforations with diameters sufficiently small to render the perforations invisible to unaided human vision (e.g., openings with lateral dimensions of less than 50 microns or other suitable size), gaps between interlaced strands in fabric layers, and/or other light-transmitting structures.

Figure 12:
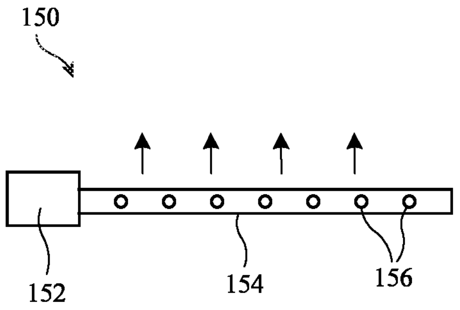
FIG. 12 is a cross-sectional side view of an illumination system in accordance with an embodiment.

FIG. 12 is a cross-sectional side view of an illustrative waveguide-based illumination system for earbud 10. Illumination system 150 of FIG. 12 includes a light source such as light-emitting device 152 (e.g., a laser or light-emitting diode) and includes a light guiding structure (light guide) such as waveguide 154. Waveguide 154 may be formed from an optical fiber, an elongated strip of polymer (e.g., a transparent polymer layer), and/or other transparent light guiding structures. Light-scattering structures may be formed in waveguide 154. For example, light-scattering particles 156 may be incorporated into waveguide 154 and/or surface features such as bumps, ridges, and/or other protrusions and/or pits, grooves, and/or other depressions may be incorporated into the surfaces of waveguide 154. Embedded light-scattering particles 156 may be formed from inorganic particles (e.g. particles of titanium oxide, aluminum oxide, silicon oxide, etc.), may be formed from gas-filled bubbles, etc. Waveguide 154 may be formed from flexible material so that system 150 can flex as earbud 10 is bent.

The soft materials used in covering the internal components of earbud 10 may allow earbud 10 to be changed in shape and size to fit the ears of different users, to accommodate different modes of use (e.g. walking, running, sleeping, resting, etc.), to take on a compact shape for storage or battery charging, etc.

Figure 13:
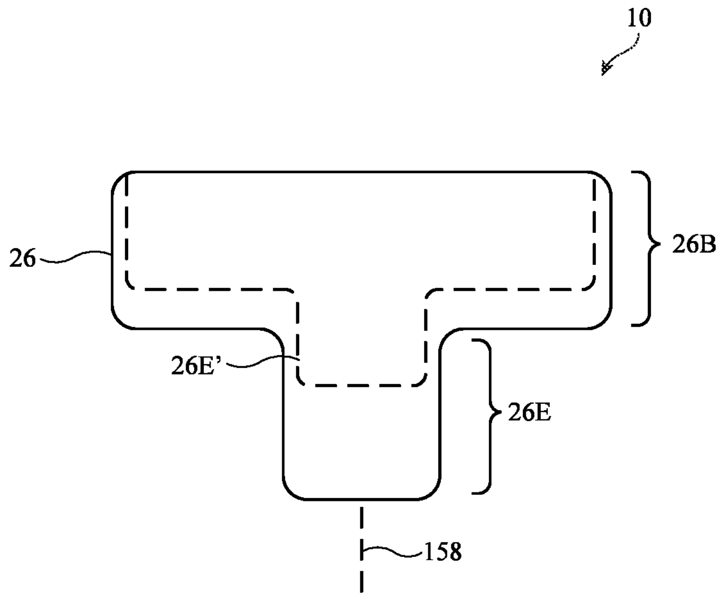
FIG. 13 is a side view of an illustrative earbud with an axially adjustable housing in accordance with an embodiment.

FIG. 13 is a cross-sectional side view of earbud 10 in an illustrative configuration in which the height of housing 26 can be adjusted by axially expanding or contracting housing 26 along axis 158. In the FIG. 13 example, housing 26 has base 26B (e.g., a base portion with a circular footprint) from which a cylindrical ear portion such as portion 26E extends. Speaker 60 may be formed in ear portion 26E. During normal use, portion 26E may be placed in an extended position to allow portion 26E to be received within ear 80. During storage or use during sleep, the profile of earbud 10 may be decreased by pressing portion 26E into base 26B (e.g., to position 26E'). The height of base 26B may also decrease when reconfiguring earbud 10 for sleep use in this way. Accordion-shaped internal housing supports (e.g., an accordion-shaped internal frame), sliding nested members, movable engaging rails, compressible foam, and/or other adjustable-shape support members may be used to allow the shape and size of earbud 10 to be adjusted in this way. By using soft materials in the layers of housing 26 (e.g., soft foam, soft fabric, soft polymer, etc.), the structures of housing 26 can accommodate changes to the configuration of housing 26 (e.g., height changes or other thickness changes of the type illustrated in FIG. 13 in addition to or instead of bending-induced housing changes).

Figure 14:
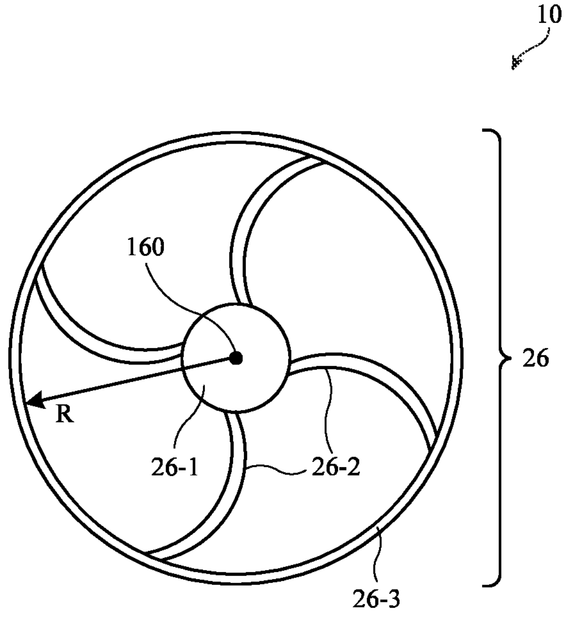
FIG. 14 is an end view of an illustrative adjustable circumference housing in accordance with an embodiment.

FIG. 14 is an illustrative cross-sectional side view of a portion of earbud 10 in an illustrative configuration in which housing 26 has radially expandable structures. Housing 26 has central member 26-1 (e.g., a cylindrical member that extends along a longitudinal axis of shaft 26T and/or other portions of housing 26), an outer cylindrical layer (e.g., flexible tubular member 26-3) and radially extending members 26-2. When members 26-1 and 26-3 are rotated relative to each other about rotational axis 160, the radius of member 26-3 is adjusted. This allows the diameter of housing 26 to be changed to accommodate different ear sizes, etc.

Figure 15:
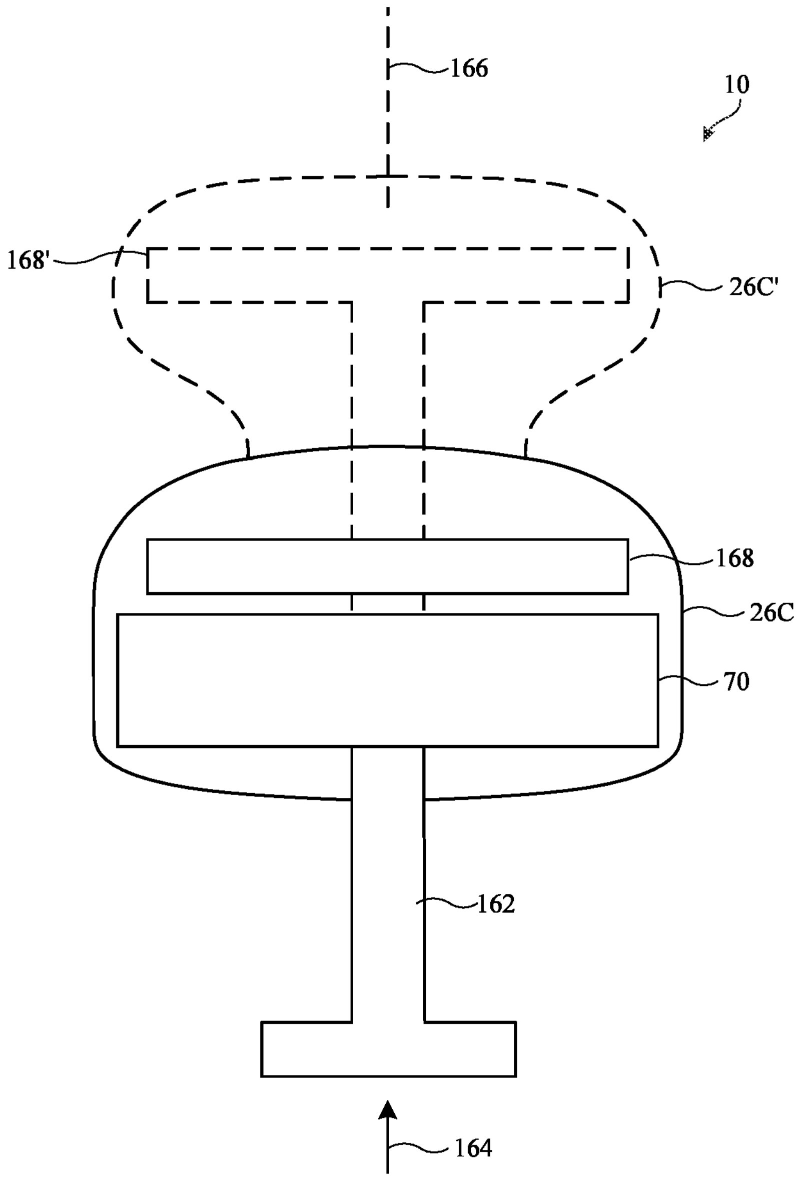
FIG. 15 is a cross-sectional side view of an illustrative bistable adjustable earbud housing in accordance with an embodiment.

FIG. 15 shows an adjustable housing configuration for earbud 10 in which housing 26 exhibits axial bistability. As shown in the cross-sectional side view of FIG. 15, earbud 10 has an axially movable member such as plunger 162. When the user presses on plunger 162 in direction 164, head 168 of plunger 162 moves to position 168'. The housing of earbud 10 has a flexible cover such as flexible cover 26C (e.g., a soft housing structure formed from foam, adhesive, elastomeric polymer layer(s), fabric spacer layer(s) fabric layer(s), etc.), which encloses plunger head 168 and internal earbud components 70. When plunger 162 is in the position shown in FIG. 15, cover 26C contracts and forms a compact shape for earbud 10 (e.g., so that earbud 10 may be configured for wearing while sleeping). When head 168 is moved to position 168', cover 26C flexes to position 26C'. Cover 26C is configured to contact inwardly when not supported from within. As a result, when plunger head 168 is in position 168', portions of cover 26C between head 168 and components 70 may shrink radially. In this state, earbud 10 may be configured to be worn while walking, sitting upright, etc. Bistability may be provided using magnets attached to plunger 162 and components 70, bistable spring structures, and/or other structures for providing bistability. The shape bistability exhibited by earbud 10 helps maintain earbud 10 in a first stable state (first stable shape) in which plunger 162 is retracted along axis 166 and a second stable state (second stable shape) in which plunger 162 is fully extended along axis 166 (so that head 168 is in position 168'). Non-bistable extendable housing arrangements may also be used, if desired.

Figure 16:
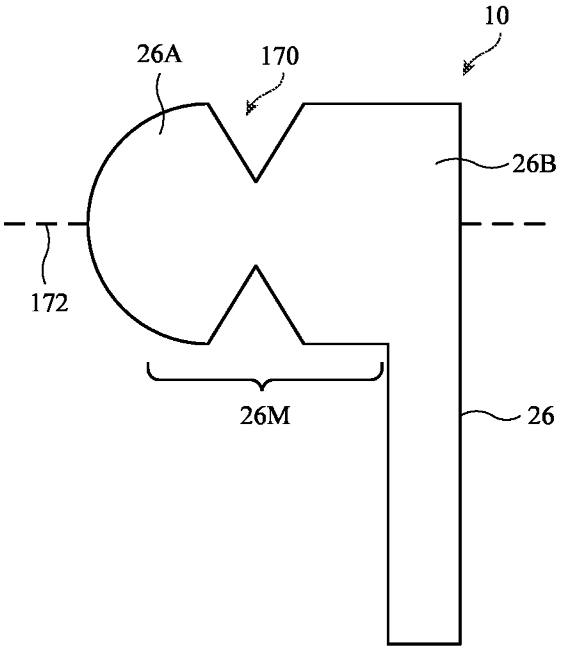
FIG. 16 is a cross-sectional side view of an illustrative earbud with an axially collapsible housing in an expanded configuration in accordance with an embodiment.
Figure 17:
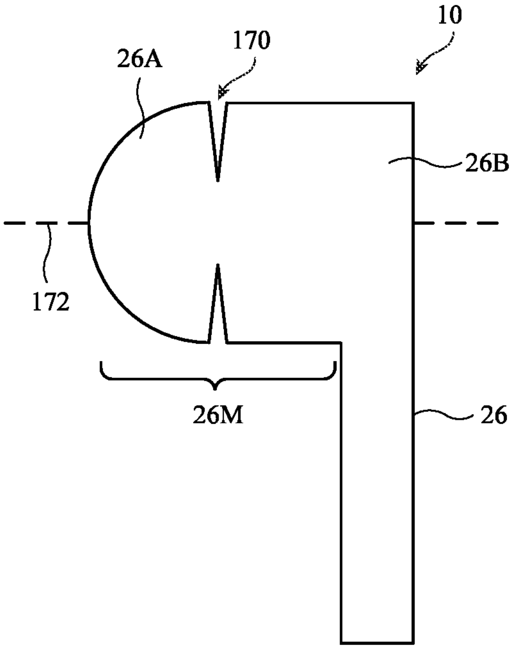
FIG. 17 is a cross-sectional side view of the illustrative earbud of FIG. 16 following axial compression to collapse the housing to a reduced-size sleep configuration in accordance with an embodiment.

Another illustrative arrangement that allows the shape and size of housing 26 in earbud 10 to be adjusted is shown in FIG. 16. In the example of FIG. 16, main portion 26M of housing 26 has a circumferential ring-shaped recess 170 (e.g., a groove with a V-shaped profile or other groove profile). Recess 170 extends around main portion of housing 26M (e.g., around main housing rotational symmetry axis 172). Recess 170 may be expanded and contracted between two stable states. In the state shown in FIG. 16, recess 170 has been expanded along axis 172, so that portions 26A and 26B of main housing portion 26M have moved away from each other to expand the size of housing portion 26M (e.g., to configure earbud 10 for normal use). When it is desired to wear earbud 10 while sleeping or to otherwise contract the size of housing portion 26M, portions 26A and 26B may be moved towards each other along axis 172. As shown in FIG. 17, this causes recess 170 to collapse and reduces the size of housing portion 26M. If desired, earbud 10 of FIG. 17 may be provided with magnets, springs, or other bistability structures, so that earbud 10 preferentially operates in the state of FIG. 16 or the state of FIG. 17, but does not tend to rest in intermediate states.

Figure 18:
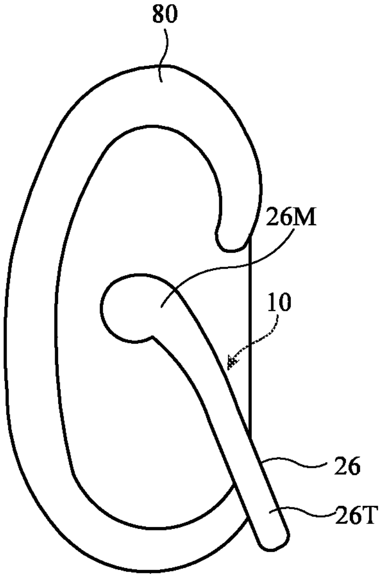
FIG. 18 is a cross-sectional side view of an illustrative earbud in a configuration that is wearable in a user's ear in accordance with an embodiment.
Figure 19:
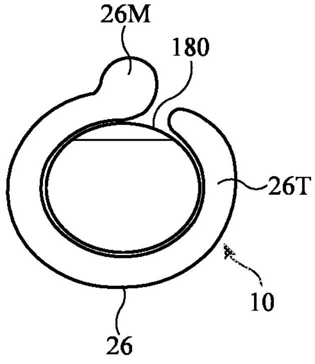
FIG. 19 is a cross-sectional side view of the illustrative earbud of FIG. 18 in a configuration that is wearable on a user's finger in accordance with an embodiment.

FIGS. 18 and 19 show how earbud 10 may be provided with a flexible housing that allows earbud 10 to be worn either on a user's ear (see, e.g., earbud 10 of FIG. 18 in ear 80) or to be worn on another user body part (see, e.g., the arrangement of FIG. 19 in which earbud 10 has been bent to wrap around the user's finger (finger 180). Bendable metal or polymer members, hinges, and/or other internal support structures that can be bent and retained in desired shapes may be used in supporting housing 26 in the earbud configuration of FIG. 18 or the ring-shaped configuration of FIG. 19. To support earbud operations of the type shown in FIG. 18, audio port 62 may be formed in main portion 26M. To support ring operations of the type shown in FIG. 19, light-emitting devices (e.g., light-emitting diodes or lasers) may be formed in portion 26M. The light-emitting devices may be used to provide a user who is wearing earbud 10 as a ring with visual alerts and/or other visible output (e.g., flashing light output to indicate that an incoming call is being received, etc.). If desired, haptic output devices may be used to provide alerts and other output. A user who is wearing earbud 10 as a ring may be alerted, for example, that the user has a voice mail message, that an incoming telephone call is being received, etc. The alerted user may, if desired, remove earbud 10 from finger 180, may bend housing 26 into a suitable earbud shape (see, e.g., the shape of FIG. 18) and can then insert earbud 10 in ear 80 to listen to the voice mail message, accept the telephone call, etc.

Figure 20:
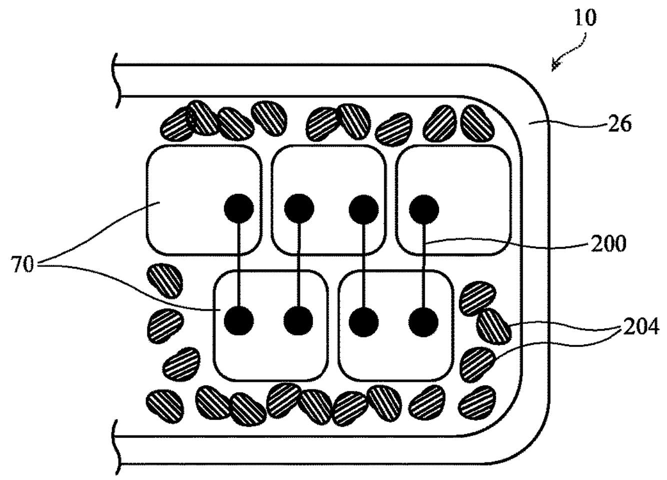
FIGS. 20, 21, and 22 are cross-sectional side views of portions of an illustrative earbud with an adjustable housing in three different states of elongation in accordance with an embodiment.

If desired, empty spaces within device 10 may be filled with a filler material that helps housing 26 retain its volume without collapsing while at the same time allowing the overall shape of housing 26 to be adjusted. Consider, as an example, the cross-sectional side views of device 10 of FIGS. 20, 21, and 22. As shown in FIG. 20, device 10 may have a housing such as housing 26 that can be adjusted in shape. Housing 26 may be formed from one or more layers of material that are soft and/or flexible so that housing 26 can be deformed into desired shapes. Housing 26 may, as an example, be formed from braided fabric or other fabric.

Components 70 (e.g., a speaker, integrated circuits, and/or other components) may be interconnected by signal paths 200 (e.g., wires, flexible printed circuits, metal traces on rigid polymer members or other dielectric substrates, and/or other signal paths). Signal paths 200 may be flexible so that components 70 may move relative to each other as the shape of device 10 is adjusted (e.g., to conform to shape of a user's ear, etc.).

To help support housing 26 (e.g., to prevent housing 26 from collapsing inwardly while still allowing the outer surface shape of housing 26 to conform to a user's ear shape or other desired shape), housing 26 may be filled with internal supporting structures such as supporting structures 204. Structures 204 may be spherical beads or other beads, chips, strips of material, or other particles that can move relative to each other to allow the shape of device 10 to be adjusted. Structures 204 and may have lateral dimensions of at least 0.05 mm, at least 0.1 mm, at least 0.2 mm, at least 0.4 mm, less than 3 mm, less than 1.0 mm, less than 0.4 mm, or other suitable size).

In an illustrative configuration, structures 204 are beads of material. Beads or other filler structures for filling otherwise empty spaces within the interior of housing 26 between rigid components such as components 70 may be formed from foam or solid polymer (e.g., polystyrene), or other material. The presence of the beads in housing 26 may allow the user to customize the fit of device 10 and may make device 10 comfortable to wear. By gently massaging the exterior of housing 26, the user may change the shape of device 10 as desired. Repeated use of device 10 over time may also tend to change the shape of device 10 to fit the user.

Figure 21:
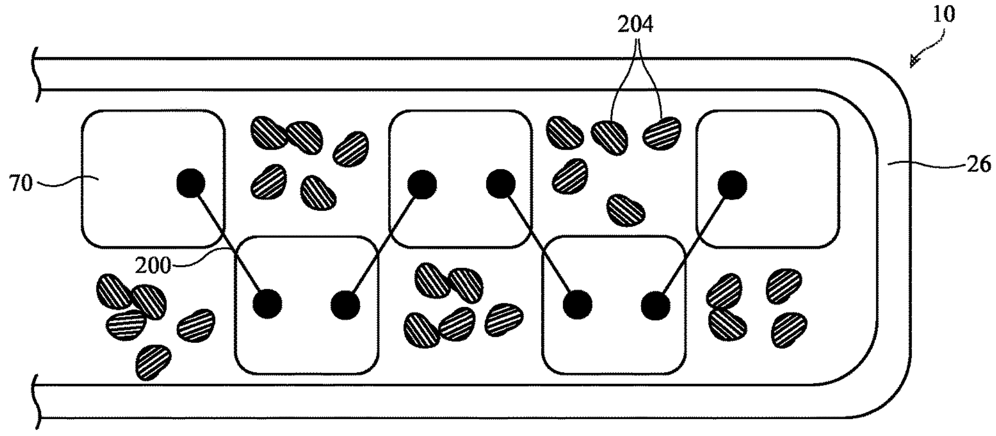
Figure 22:
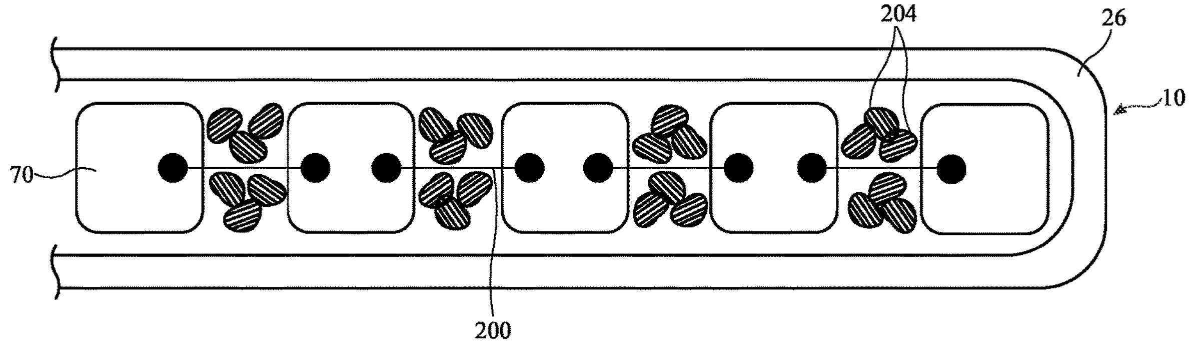
Figure 23:
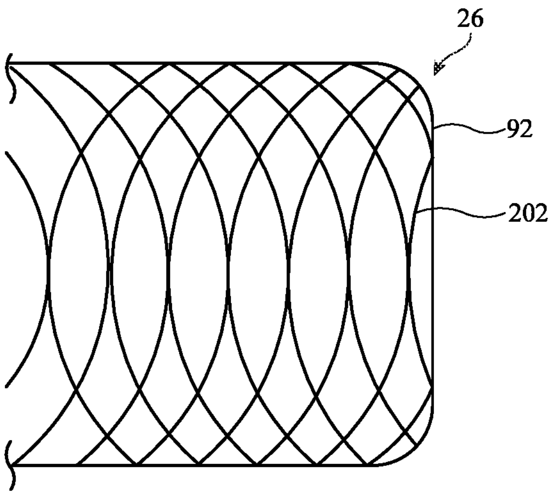
FIGS. 23, 24, and 25 are diagrams showing how the fabric of the adjustable housing of FIGS. 20, 21, and 23 can stretch to accommodate different respective elongation states in accordance with an embodiment.
Figure 24:
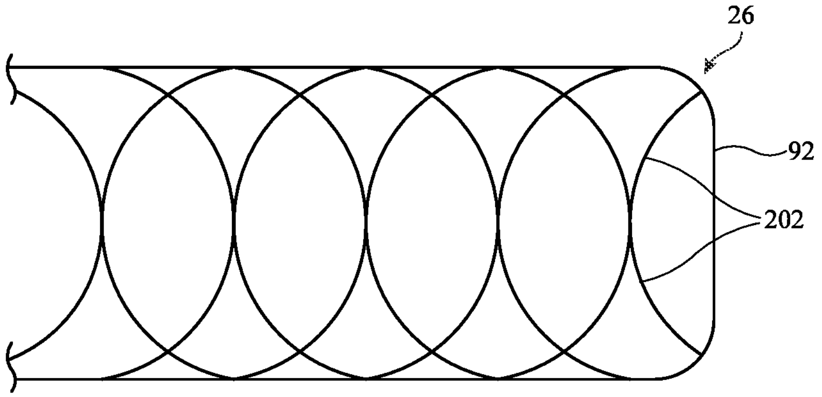
Figure 25:
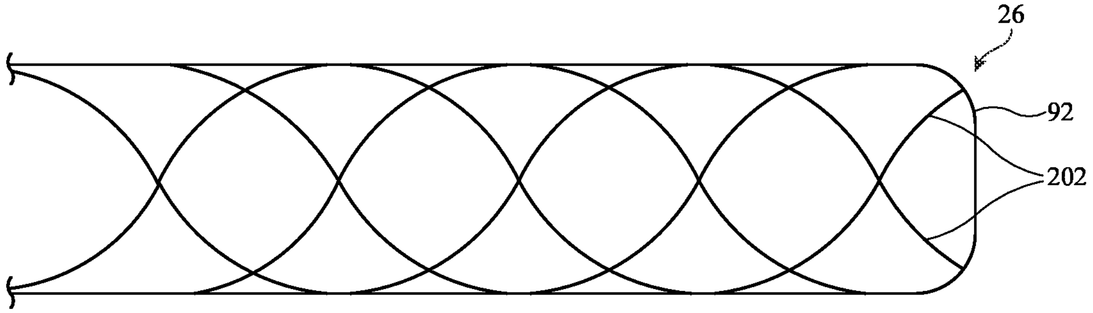

As shown by the elongated shapes of housing 26 of FIGS. 21 and 22, the use of this approach for device 10 may allow the shape of housing 26 (and therefore device 10) to be bent, stretched (e.g., elongated and narrowed), and/or otherwise deformed as desired (e.g., to change device 10 between a shape for sleeping and a non-sleep state shape). To facilitate the adjustment of the shape of housing 26, housing 26 may be formed from soft flexible materials such as braided fabric. As shown in FIGS. 23, 24, and 25, housing 26 may be formed from a braided fabric layer (e.g., fabric layer 92, formed from braided strands of material such as strands 202). This allows housing 26 to be placed in a relatively unelongated shape as shown in FIG. 23, a partially elongated shape as shown in FIG. 24, and a fully elongated shape as shown in FIG. 24 (as examples). Deformations to housing 26 may also involve bends and other housing shape changes. Optional additional layers (e.g., polymer, etc.) may be placed over and/or under a braided fabric layer or other fabric forming housing 26.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An earbud, comprising:
- wireless circuitry configured to receive data associated with audio;
- a speaker configured to play the audio;
- an input device configured to gather user input;
- an adjustable housing configured to receive the wireless circuitry, the speaker, and the input device; and
- an optical bend sensor that is configured to detect bending of the adjustable housing.

2. The earbud defined in claim 1, wherein the adjustable housing comprises a first portion and a second portion, wherein the first portion is configured to bend relative to the second portion about a bend axis, and wherein the optical bend sensor comprises:
- a light-emitting device;
- a waveguide that is configured to receive light from the light-emitting device, wherein the light is configured to propagate along the waveguide due to total internal reflection and wherein the waveguide is configured to bend when the first portion bends relative to the second portion about the bend axis; and
- a light detector that is configured to measure an amount of the light that travels an entire length of the waveguide, wherein, when the first portion bends relative to the second portion about the bend axis, total internal reflection is locally defeated in the waveguide causing a change in the amount of the light measured by the light detector.

3. The earbud defined in claim 1, wherein the optical bend sensor comprises:
- a light-emitting device; and
- a waveguide that is configured to receive light from the light-emitting device.

4. The earbud defined in claim 3, wherein the optical bend sensor comprises:
- a light detector that is configured to measure an amount of the light that travels an entire length of the waveguide.

5. The earbud defined in claim 4, wherein the adjustable housing comprises a first portion and a second portion, wherein the first portion is configured to bend relative to the second portion about a bend axis, and wherein, when the first portion bends relative to the second portion about the bend axis, total internal reflection is locally defeated in the waveguide causing a change in the amount of the light measured by the light detector.

6. The earbud defined in claim 3, wherein the waveguide is an optical fiber.

7. The earbud defined in claim 3, wherein the waveguide is a strip of clear polymer.

8. The earbud defined in claim 3, wherein the light-emitting device is a laser.

9. The earbud defined in claim 3, wherein the light-emitting device is a light-emitting diode.

10. The earbud defined in claim 1, further comprising a waveguide-based illumination system that comprises:
- a light source;
- a waveguide that receives light from the light source; and
- light-scattering structures in the waveguide.

11. An earbud, comprising:
- wireless circuitry configured to receive data associated with audio;
- a speaker configured to play the audio;
- an input device configured to gather user input; and
- an adjustable housing configured to receive the wireless circuitry, the speaker, and the input device, wherein the adjustable housing comprises:
  - a base portion; and
  - a cylindrical portion that houses the speaker, wherein the adjustable housing is operable in a first configuration in which the cylindrical portion extends from the base portion and has a first height relative to the base portion and a second configuration in which the cylindrical portion is pressed into the base portion and has a second height relative to the base portion that is less than the first height.

12. The earbud defined in claim 11, wherein the base portion has a circular footprint, wherein the base portion has a third height in the first configuration and a fourth height that is less than the third height in the second configuration, wherein the adjustable housing comprises compressible foam, and wherein the cylindrical portion is configured to be received by an ear while the adjustable housing is in the first configuration.

13. The earbud defined in claim 11, wherein the base portion has a circular footprint.

14. The earbud defined in claim 11, wherein the base portion has a third height in the first configuration and a fourth height that is less than the third height in the second configuration.

15. The earbud defined in claim 11, wherein the adjustable housing comprises compressible foam.

16. The earbud defined in claim 11, wherein the adjustable housing comprises an accordion-shaped internal frame.

17. The earbud defined in claim 11, wherein the cylindrical portion is configured to be received by an ear while the adjustable housing is in the first configuration.

18. An earbud, comprising:

wireless circuitry configured to receive data associated with audio;

a speaker configured to play the audio;

an input device configured to gather user input;

an adjustable housing configured to receive the wireless circuitry, the speaker, and the input device, wherein the adjustable housing comprises a main portion and a stalk portion and wherein the stalk portion is configured to bend relative to the main portion about a bend axis; and a bendable support structure in the adjustable housing comprising first and second members that are rotatably coupled to each other at a hinge that is aligned with the bend axis.

19. The earbud defined in claim 18, wherein the first and second members are first and second interlocking members.

20. The earbud defined in claim 18, wherein the bendable support structure holds a bent shape when bent.

* * * * *